United States Patent [19]

Hama

[11] Patent Number: 5,033,820
[45] Date of Patent: Jul. 23, 1991

[54] ELEMENT SELECTING DEVICE AND ELEMENTS COMPRISING A PLURALITY OF OPTICAL FILTER UNITS

[75] Inventor: Yoshihiro Hama, Tsurugashima, Japan

[73] Assignee: Asahi Kogaku Kogyo Kabushiki Kaisha, Tokyo, Japan

[21] Appl. No.: 382,315

[22] Filed: Jul. 20, 1989

[30] Foreign Application Priority Data

Jul. 21, 1988 [JP]  Japan ................................ 63-183167

[51] Int. Cl.⁵ .......................... G02B 5/22; G02B 7/00
[52] U.S. Cl. .................................. 350/315; 350/317; 350/318
[58] Field of Search ...................... 350/315, 317, 318; 355/35, 228; 362/293

[56] References Cited

U.S. PATENT DOCUMENTS

| | | | |
|---|---|---|---|
| 3,028,483 | 4/1962 | Simmon | 350/318 |
| 3,912,362 | 1/1975 | Bentley | 350/315 |
| 4,588,266 | 5/1986 | Komoto . | |
| 4,746,955 | 5/1988 | Slayton et al. | 350/318 |
| 4,825,252 | 4/1989 | Suzuki et al. . | |

FOREIGN PATENT DOCUMENTS

| | | | |
|---|---|---|---|
| 444402 | 1/1949 | Italy | 350/318 |
| 89944 | 4/1987 | Japan | 350/35 |
| 8401139 | 11/1985 | Netherlands | 350/315 |

*Primary Examiner*—Jon W. Henry
*Attorney, Agent, or Firm*—Sandler, Greenblum & Bernstein

[57] ABSTRACT

In a filter conversion device employed in an optical system having a function for locating one of a plurality of color filter units in an optical path frame member is provided supporting a plurality of filter units and being arranged so as to be movable in a predetertmined plane between a light sending element and a light receiving element. A mechanism for controlling the frame member to move horizontally and vertically in the plane is also provided. Thus, the desired filter unit is located in the optical path without requiring a large space for movement.

8 Claims, 5 Drawing Sheets

ELEMENT SELECTING DEVICE AND ELEMENTS COMPRISING A PLURALITY OF OPTICAL FILTER UNITS

BACKGROUND OF THE INVENTION

This invention relates to an element selecting device having a function capable of selecting one of a plurality of optical elements provided on a frame and locating the selected one in an optical path; and, more particularly, to an element selecting device arranged so as to be smoothly moved in a predetermined plane having a positional relationship with the optical path.

For example, as one example of the above-optical element, an optical filter is considered which is capable of passing light corresponding to a predetermined wavelength.

Conventionally, in electronic copy machines which make copies employing so-called electrophotographic system and in image processing devices such as an image scanners which scan a character side of an original and read the image data as electric signals, devices having a function for separating the colors of original to make color copies and for obtaining signals corresponding to a plurality of colors have been known.

Various color separation methods including a method in which the character side of the original is irradiated by illuminating light corresponding to a specific wavelength have been generally considered. In many methods, one specific filter is selected from three types of filters, namely, red, green, and blue plus an ND filter which is included in most cases, and the selected filter is placed in an optical path from the character side of the original to a photoconductive drum or a light receiving element. The images corresponding to the original which pass through various filters are scanned or transferred. In the electronic copy machines, the passing light, having been passed through the various filters are developed, transferred, and fixed by utilizing cyan, magenta, and yellow toners so as to make color copies.

In the image processing device which places a selected filter from a plurality of filters in an optical path from the character side of the original to the light receiving element, a disk plate on which a plurality of filters are provided around the same circumference of the disk plate can be rotated about a shaft in parallel to the optical path so that the desired position on the circumference where the filters are provided matches the optical axis of the light being transmitted from the original to the light receiving element. By rotating the disk plate, the filters on the optical path are changed. Alternatively, a plurality of specific filters are provided on a filter frame in series and by matching the center of the filters with the optical axis, the filter frame can be moved in the direction where the filters are provided. Moreover, a plurality of filters are fixed around the rotating axis so that the filters are placed in parallel to the rotating axis and the axis is located in perpendicular to the optical axis. By turning the filters around the rotating axis, one of them can be selected and selectively located on the optical path. In addition, the filters are often larger circles than image circles on an optical path where they are placed in any structure.

However, in these conventional structures as described above, due to an installation of the device including the filters and a motion of filter conversion mechanisms for placing the desired filter on the optical path, wide spaces are required, which prevent the entire device from being miniaturized.

In other words, for the device which utilizes a disk plate on which a plurality of filters are provided around the same circumference, a space which is two times or more the diameter of the filters is required in the vertical direction. On the other hand, for the device which moves the filter frame where the filters are provided in a straight line, a space which is equivalent to a motion stroke on both the left and right sides in the moving direction of the filter frame (for example, the space for three filters is required in case that the four filters are provided) is required.

In other structures, wide installation and moving space are also required.

SUMMARY OF THE INVENTION

It is therefore an object of the invention to provide an improved element selecting device which can locate the entire device in a small space without requiring a large space for the installation and motion thereof.

For this purpose, according to this invention, there is provided an element selecting device for locating one of a plurality of elements at a desired position on a predetermined plane, said element selecting device comprises:

a plate-shaped member supporting said elements and being moveable in said predetermined plane; and control means for controlling said plate-shaped member so as to move horizontally and vertically in said predetermined plane.

With the above constructed element selecting device, a frame supporting a plurality of optical elements, for example, optical filters, is smoothly moved and a desired element is located in an optical path of a light propagating from a light sending element to a light receiving element.

DESCRIPTION OF THE ACCOMPANYING DRAWINGS

Figure 7A:
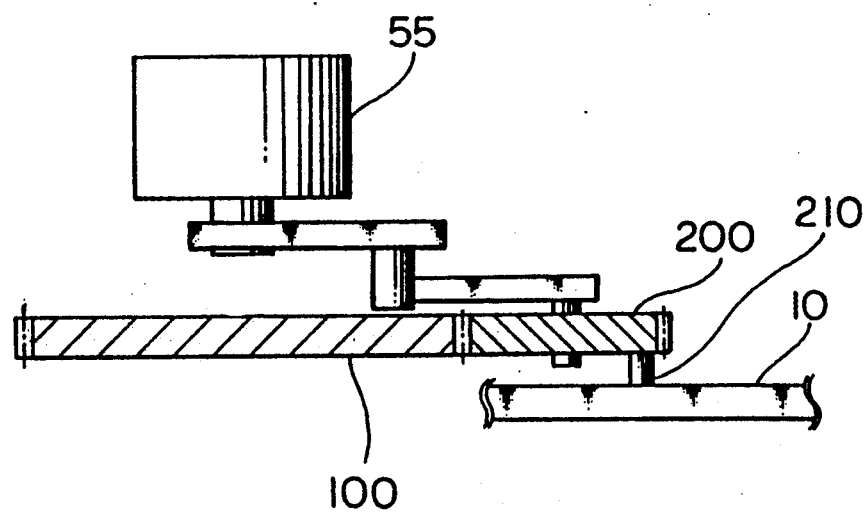
Figure 7B:
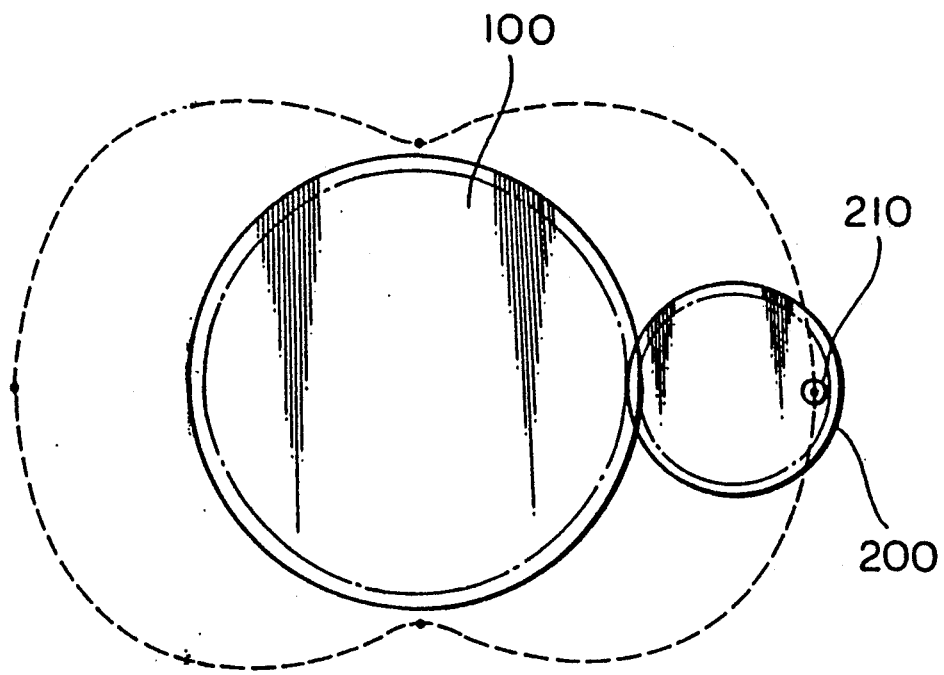
Figure 8A:
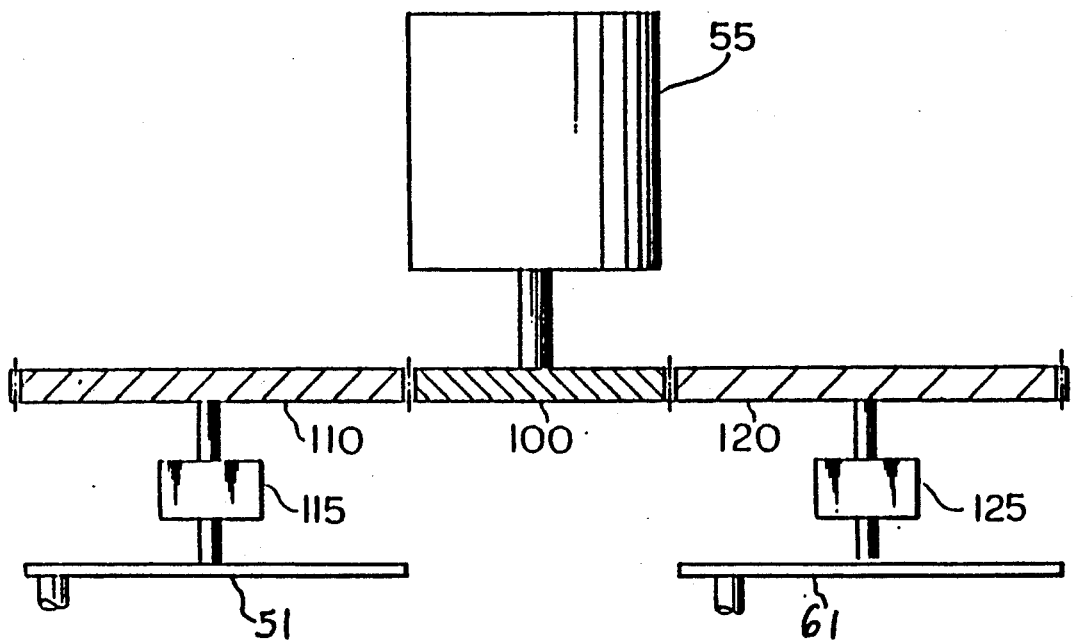
Figure 8B:
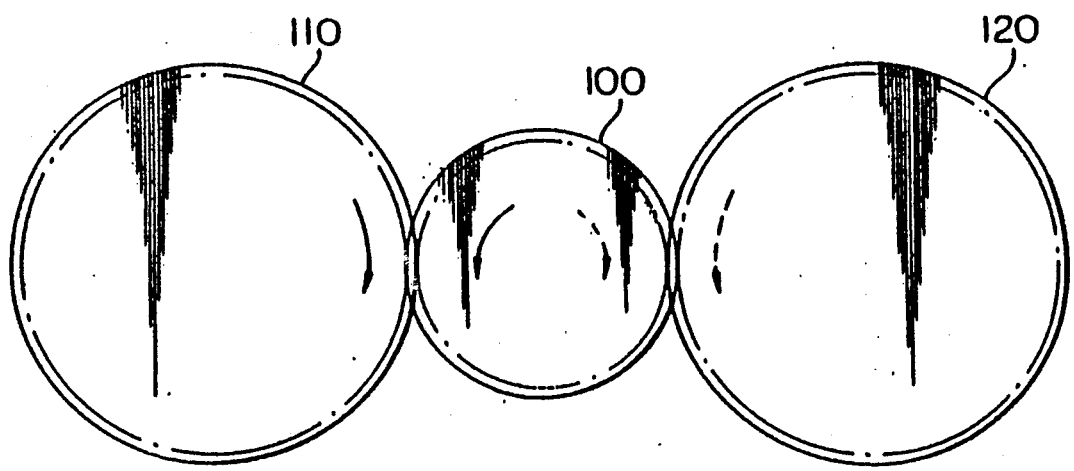

FIGS. 7(A) and 7(B) are explanatory views of a one embodiment of the present invention; and FIGS. 8(A) and 8(B) are explanatory views of another embodiment of the present invention.

DESCRIPTION OF THE EMBODIMENTS

Referring to the attached drawings, embodiments of the present invention will be described below.

Figure 1:
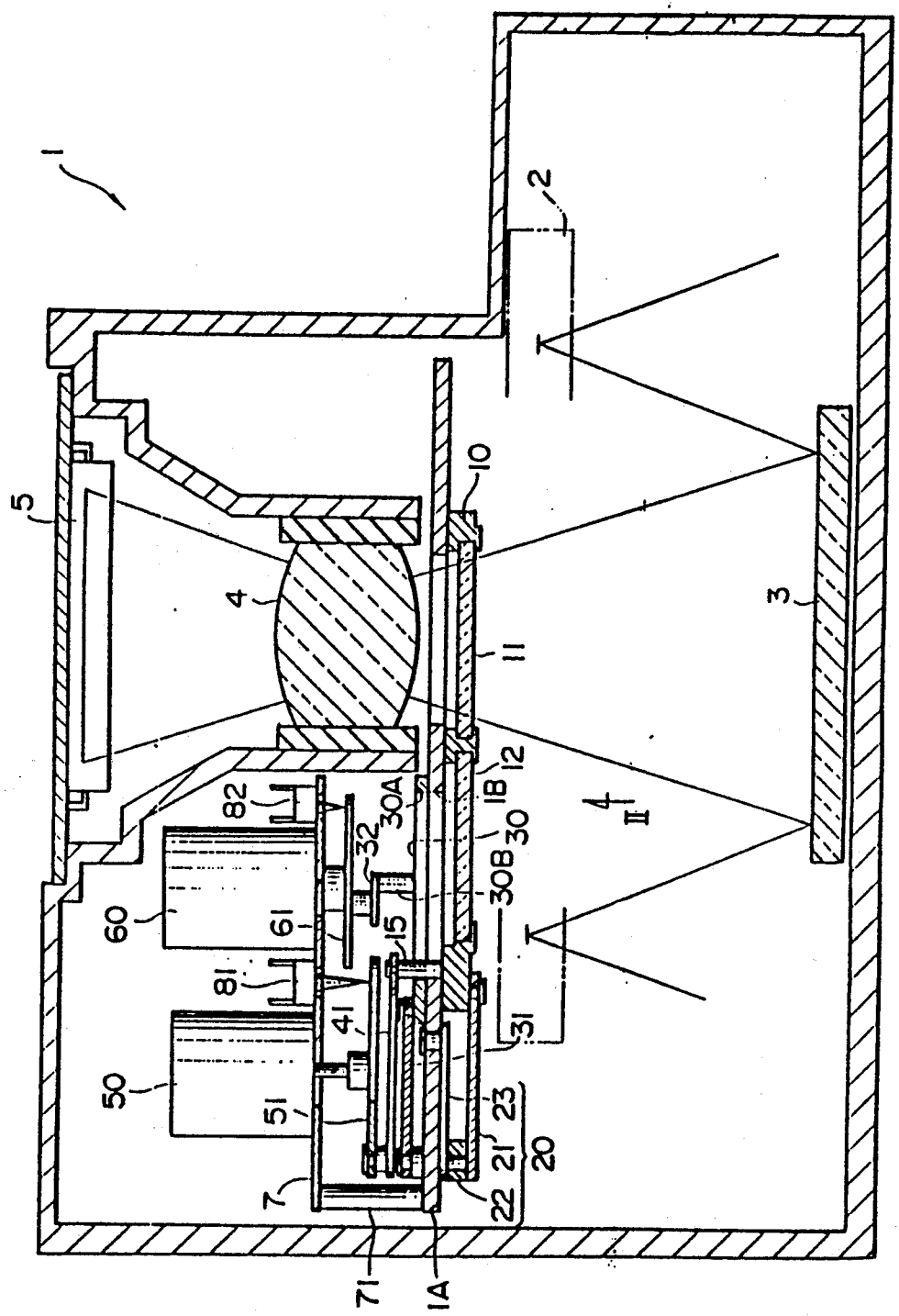
FIG. 1 shows a longitudinal section schematic of an image scanning device embodying the filter conversion device according to the present invention.

FIG. 1 shows a cross sectional view taken along a horizontal direction and viewed from the top of a scanning head 1 of an image scanning device incorporating the filter conversion device of the present invention.

Light from the character side of an original, not shown, is reflected by mirrors 2 and 3 and introduced to a lens 4. The lens 4 focuses the rays on the light reception surface of a CCD (Charge Coupled Device) sensor 5. The CCD sensor 5 reads the image information as electric signals.

The CCD sensor 5 is a line sensor wherein picture elements are positioned in a row. The CCD sensor 5 endlessly scans the character side of the original in response to a movement of the scanning head 1 or the original.

Between the mirror 3 and the lens 4, a filter frame 10 which is provided with filters 11, 12, 13, and 14 is placed. As the filter frame 10 moves, a desired filter (11, 12, 13, or 14) is selectively placed in the optical path of incident light to the lens 4. With the light having a wavelength which passes through the desired filter, the original can be scanned.

Figure 2:
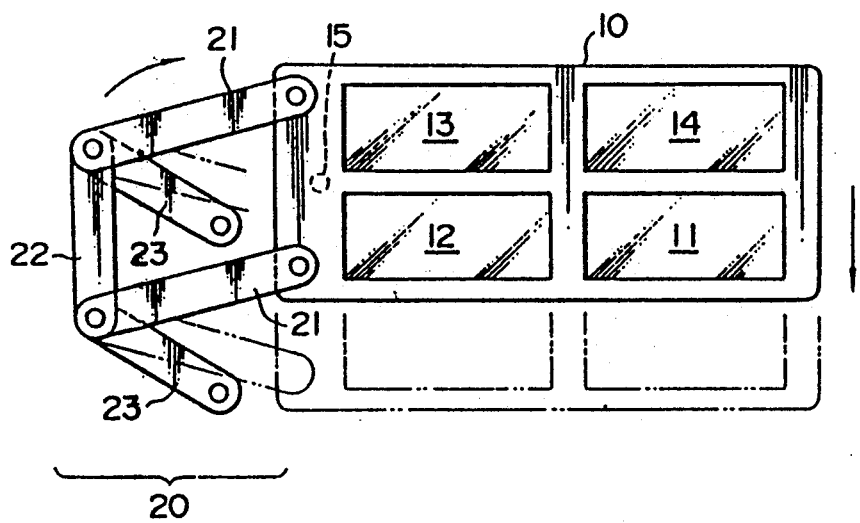
FIG. 2 shows a schematic in the direction of an arrow II of FIG. 1, illustrating an arrangement of a filter conversion device according to the invention.
Figure 3:
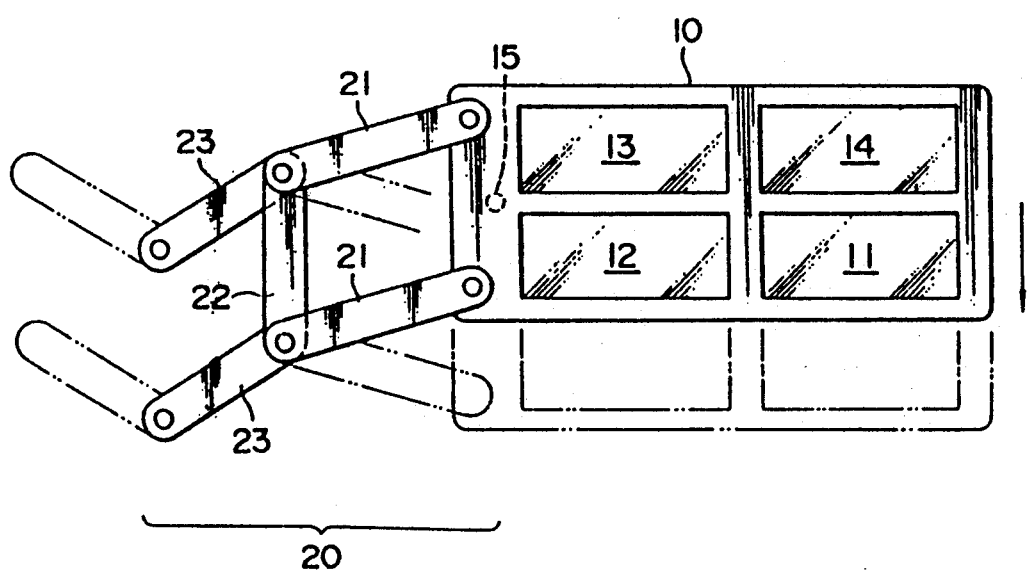
FIG. 3 shows an explanatory view for explaining a moving state of the filter conversion device of FIG. 2.

As shown in FIG. 2 and FIG. 3, the filter frame 10 is provided with two rows of opening portions both in a horizontal direction and a vertical direction wherein the filters 11, 12, 13, and 14 are respectively mounted. The filter 12 is red; the filter 13 is green; the filter 14 is blue; and the filter 11 is an ND filter which is used for a monochrome original or for a monochrome output even if a colour original is scanned.

The shape of the filters 11, 12, 13, and 14 is of a thin rectangle because the CCD sensor 5 is a line sensor which does not use the entire image circle, but only a specific portion. Thus, the length of the filter frame 10 along the vertical direction can be reduced, thereby reducing the entire space of the device.

The filter frame 10 is mechanically connected with a wall 1A as a support member which is provided in the frame of the scanning head 1 by a link mechanism 20.

The link mechanism 20 consists of first link 21, a joint rod 22, and second links 23, the first and second links 21, 23 are connected with the joint rod 22.

On the upper and lower sides of one end of the filter frame 10, one end of each first link 21 is pivoted so that one end of the first links 21 can be freely slid. The length of the top first link 21 is the same as that of the bottom first link 21.

The other end of each of the first links 21 is pivoted to both the ends of the joint rod 22 so that the first links 21 can be freely slid. The pivot supporting point distance of the joint rod 22 is the same as that of the first link 21 of the filter frame 10. Thus, a four-node parallel linkage is composed of the filter frame 10, first link 21, and joint rod 22. At the pivot supporting point between the first links 21 and the joint rod 22, one end of the second links 23 are pivoted so that it can be freely slid. The other end of the second links 23 are pivoted to the wall 1A so that the second links 23 can be freely slid. The distance from the pivot supporting points to the wall 1A is the same as that the length of the joint rod 22. In other words, a four-node parallel linkage can be also formed with the wall 1A, second links 23, and joint rod 22. On the other hand, the upper and lower pivot supporting points of the second links 23 on the wall 1A are placed so that they are on a vertical line.

In the structure described above, the filter frame 10 is restrained by each link of the link mechanism 20 so that the parallel state is always maintained and the position of the filter frame 10 can be varied in a plane along the vertical direction. The dimensions and position of each element (first links 21, joint rod 22, and second links 23) which form the link mechanism 20 determine the movable range of the filter frame 10 so that the center position of each of the four filters supported by the filter frame 10 match the center optical axis of the light being transmitted from the mirror 3 to the lens 4. In addition, the plane of the lens 4, of the filter frame 10, of the mirror 3 and of the wall 1A are aligned so that the filters can be slid into such alignment, as the filter frame 10 moves along wall 1A.

In the following, a drive mechanism which places any filter that is positioned by moving the filter frame 10 in the optical path will be described.

Figure 6:
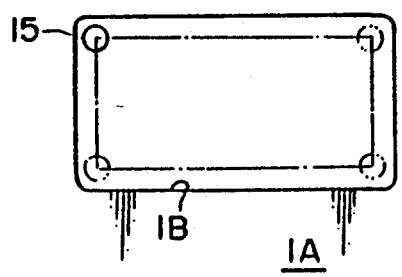
FIG. 6 shows a hollow portion provided on a frame supporting the filter conversion device of FIG. 2, in which a pin provided on the filter conversion device is moved in response to a movement of the filter conversion device.

A drive pin 15 is provided on the wall 1A side at the end where the first links 21 are pivoted on the filter frame 10. The drive pin 15 protrudes to the opposite side of the wall 1A through an opening portion 1B of the wall 1A, as shown in FIG. 6.

The drive pin 15 which is extruded to the opposite side of the wall 1A is inserted into a slotted hole 30A on a guide plate 30 which is described later so that the drive pin 15 can be slid along the slotted hole 30A. In addition, at the end where the drive pin 15 passes through the slotted hole 30A, one end of the drive arm 41 is pivoted as shown in FIG. 4.

Figure 4:
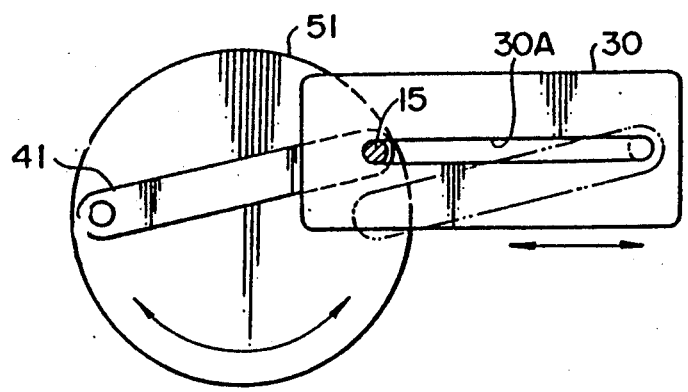
FIG. 4 shows an explanatory view for explaining a state in which the filter conversion device of FIG. 2 is holizontally driven.
Figure 5:
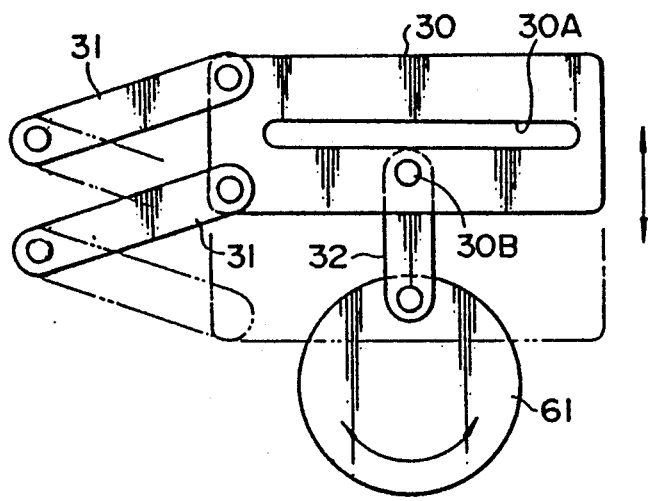
FIG. 5 shows an explanatory view for explaining a state in which the filter conversion device of FIG. 2 is vertically driven.

The guide plate 30 is rectangular as shown in FIGS. 4 and 5. At the center thereof, a longitudinally slotted hole 30A is provided. At the upper and lower portions of one end thereof, one end of the links 31 are pivoted so that the links 31 can be rocked.

The distance of the pivot supporting point to the wall 1A is selected so that the distance of the pivot supporting points is the same as that of the guide plate 30 and so that the vertical pivot supporting points which pivot the links 31 are located on a vertical line. In other words, a four-node parallel linkage is composed of the guide plate 30, links 31, and wall 1A. The guide plate 30 can be moved vertically along a circle the radius of which is equal to the length of the link 31 in the manner that the slotted hole 30A is kept horizontal.

The other end of the drive arm 41 is pivoted at a specific position on one side of a disk plate 51 which is fixed to a spindle of a horizontal drive motor 50. In other words, when the horizontal drive motor 50 rotates the disk plate 51, the drive arm 41 causes the drive pin 15 to reciprocate along the slotted hole 30A of the guide plate 30. As the result, the filter frame 10 which is fixed to the drive pin 15 also reciprocates along the slotted hole 30A, namely, it moves horizontally. At both the ends of the reciprocation, the vertical line which passes through the center of the left side filters 12 and 13 and the right side filters 11 and 14 which are supported by the filter frame 10 matches the center of the optical path from the mirror 3 to the lens 4. In other words, the amount of reciprocation is equal to a pitch in the horizontal direction of the right side filters 14 and 11 and the left side filters 13 and 12. The horizontal drive motor 50 is a flange type pulse motor, and is fixed to a bracket plate 7 which is supported by the wall 1A with the stud bolt 71.

A pin 30B is horizontally positioned at the center of the guide plate 30 and below the slotted hole 30A. As shown in FIG. 5, the pin 30B is engaged to a link plate 32 so that one end of the link plate 32 can be slid and rotated. The other end of the link plate 32 is pivoted in a specific position on one side of a disk plate 61 which is fixed to the spindle of a vertical drive motor 60. In other words, when the vertical drive motor 60 rotates the disk plate 61, the guide plate 30 is vertically moved on a path which is regulated by the link 31. At both ends of the vertical motion, a horizontal line which passes through the center of the upper side filters 13 and 14 and the lower side filters 11 and 12 which are supported by the filter frame 10 matches the center of the optical path from the mirror 3 to the lens 4. In other words, the amount of vertical motion is equal to a pitch in the vertical direction of the upper side filters 13 and 14 and lower side filters 11 and 12. In addition, the vertical drive motor 60 is a flange type pulse motor like the horizontal drive motor and is fixed to the bracket plate 7 parallel to the horizontal drive motor 50.

Consequently, the filter conversion mechanism structured as above allows the horizontal drive motor 50 and the vertical drive motor 60 to move the drive pin 15 on the route as shown in FIG. 6, thereby each filter supported by the filter frame 10 is placed in the manner that the center of each filter matches the optical path of the light being transmitted from the mirror 3 to the lens 4.

In other words, the filter frame 10 horizontally reciprocates one time whenever the horizontal drive motor 50 rotates for one turn. Moreover, the filter frame 10 vertically reciprocates one time whenever the vertical drive motor 60 rotates for one turn. Consequently, when any filter, for example, the ND filter 11, is in the optical path, namely, when the center of the ND filter 11 matches the central optical axis, by rotating either the horizontal drive motor 50 or vertical drive motor 60, another filter 12 or 14 located adjacent to the ND filter 11 can be placed in the optical path (namely, the filter can be changed). By repeating such operations, the desired filter selected from the filters 11, 12, 13, and 14 supported by the filter frame 10 can be placed in the optical path.

Practically, reflection type photo-interrupters 81 and 82 are placed on the bracket plate 7 where the horizontal drive motor 50 and the vertical drive motor 60 are fixed in a manner that the reflection type photo-interrupters 81 and 82 respectively face the disk plates 51 and 61. In addition, when the ND filter 11 is placed in the optical path, the photo-interrupters 81 and 82 detect reflection members, not shown, fixed to the disk plates 51 and 61 so as to output signal corresponding to the detection of the ND filter 11. Since a positional relationship between the ND filter 11 and each of the other filters have been determined in accordance with the position of the ND filter 11, the charging of a filter placed in the optical path from the ND filter 11 to any other filter can be accomplished by sequentially controlling the horizontal drive motor 50 and vertical drive motor 60 which are both pulse motors.

For example, as shown in FIG. 2, by rotating the horizontal drive motor 50 for a half turn, the ND filter 11 which is placed in the optical path can be converted to the red filter 12 as shown in FIG. 3. Moreover, by rotating the horizontal drive motor 50 for a half turn and by rotating the vertical drive motor 60 for a half turn, the ND filter 11 which is placed in the optical path can be converted to the green filter 13 which is positioned symmetrical to the ND filter 11 about the center of the filter frame. Even if the filter which is placed in the optical path is uncertain, by rotating the horizontal drive motor 50 and the vertical drive motor 60 until the photo-interrupters 81 and 82 generate a signal corresponding to the detection of the ND filter 11, namely, until the reference filter (ND filter 11) is placed in the optical path, the filter position can be initialized.

As another method for detecting the type of filter which is placed in the optical path, where each filter placed in the optical path is provided with a plurality of sensors and a plurality of detection members mounted on the disk plates 51 and 61, different signals (or any combination thereof) are output to completely detect the type of the filter placed in the optical path.

The drive mechanism of the filter frame 10 can be constructed in any other manner rather than being limited to the above embodiment. In the above embodiment, independent motors, namely horizontal drive motor 50 and vertical drive motor 60, are provided for the motions, namely, horizontal and vertical motions, for driving the filter frame 10. However, it is also possible to drive the filter frame 10 by a single motor. For example, as shown in FIG. 7(A) and (B), a small diameter epicyclic gear 200 is driven to rotate around a non-driven large diameter gear 100 by a single motor 55. Both of these gears are adapted to be brought into engagement with each other. The motor is drivingly connected to driven gear 200 by any conventional motion transmission mechanism, such as a pulley and endless belt mechanism mounted via a lever or link system to enable the gear 200 to travel about gear 100 as shown in FIGS. 7a and 7b. A pin 210 is provided on one side of the epicyclic gear 200 so that it moves along a peri-trochoid curve defined by a gear ratio of the large diameter gear and the epicyclic gear 200. The position at which each of the filters 11, 12, 13, and 14 is placed in the optical path matches specific positions of the peri-trochoid curve as shown in FIG. 7(B) by the dots along the dashed path of the pin 210.

In a further embodiment, as shown in FIG. 8(A) and (B), gears 110 and 120 are mounted on the shafts which are the center of rotation of the disk plates 51 and 61 (FIGS. 4 and 5) through one-way clutches 115, 125 which allows the force of reverse rotation to be transferred. The gears 110, 120 are engaged with a drive gear 100 which is fixed to the spindle of the drive motor 55. Utilizing the structure illustrated in FIGS. 8a and 8b and as described above, depending upon the direction of rotation of the motor 55 (and of the gear 200), and by virtue of the one-way clutches 115, 125, one of the disc plates 51, 61 (FIG. 8a) will be driven to move the frame 10 either vertically or horizontally. Thus, by sequentially rotating the motor 55 in opposite directions, the filter frame 10 of FIG. 1 can be sequentially moved in the corresponding horizontal and vertical directions via the slotted disc plates 51,61. In this embodiment of the drive mechanism, although the time required for filter conversion is slightly longer than that of the above embodiments, the filter frame 10 of FIG. 1 can be driven via the disc plates 51, 61 (FIGS. 4, 5) with only one motor, thereby reducing the cost of the production.

In addition, the above embodiments is applied to an image scanning device, it is also possible to apply it to a color copy machine.

Further, it may be considered that a plurality of Fresnel lenses are provided on the frame instead of the filters as the optical elements, with each of the lenses respectively having a predetermined focal length. This arrangement is able to be applied to a copy machine having a function being capable of varying a magnifying power, and the like.

What is claimed is:

1. An element selecting device for locating one of a plurality of elements at a desired position on a predetermined plane, said element selecting device comprising:
   a plate-shaped member supporting said elements and being movable in said predetermined plane, said plate-shaped member supported by a plurality of link members, each of said link members being arranged in parallel with each other; and
   control means for controlling said plate-shaped member so as to move horizontally and vertically in said predetermined plane;
   said elements comprising a plurality of optical filter units, each of said filter units respectively passing a light corresponding to a predetermined wavelength, and wherein said predetermined plane is placed between a light sending element and a light receiving element and perpendicular to a central optical axis of light propagating from said light sending element to said light receiving element.

2. The element selecting device according to claim 1 wherein said control means comprises a drive source for generating a drive force and transmitting means mechanically connected to said plate-shaped member for transmitting said drive force from said drive source to said plate-shaped member.

3. The element selecting device according to claim 2 wherein said drive source comprises two motors having drive spindles which are respectively connected to circle-shaped plates, said plate-shaped member being horizontally and vertically movable in said predetermined plane in response to rotation of each of said circle-shaped plates.

4. The element selecting device according to claim 3 wherein said transmitting means comprises a guide plate member provided on said plate-shaped member including a projection part connected to one of said circle shaped plates through a link member movable in one of the horizontal and vertical directions in response to rotation of said one of said circle-shaped plates, said projection part having an opening extending along the other direction in which a pin member fixed on said frame member and connected to the other of said circle-shaped plates through an arm member is slidably moved.

5. The element selecting device according to claim 2 wherein said drive source comprises a single motor having a spindle which is connected to a gear member, and wherein said transmitting means comprises a guide plate member provided on said plate-shaped member including a projection part connected to a circle-shaped plate adapted to be brought into engagement with said gear member through a link member movable in one of horizontal and vertical directions in response to rotation of said circle-shaped plate, and said guide plate having an opening extending along the other of said directions in which a pin member fixed on said plate-shaped member and connected to another circle-shaped plate adapted to be brought into engagement with said gear member through an arm member is slidably moved, each of said circle-shaped plates, respectively, being connected to one-way clutch members and being respectively rotatable in response to only one rotating direction of said gear member.

6. The element selecting device according to claim 1, wherein said control means further controls said plate-shaped member such that one of said elements is located at said desired position in accordance with a positional relationship between said one of said elements and a predetermined element supported on said plate-shaped member.

7. A filter conversion device for placing one of a plurality of filter units between a light sending element and a light receiving element, each of said filter units respectively passing a light corresponding to a predetermined wavelength, said filter conversion device comprises:
   a frame member supporting said filter units and being movable in a predetermined plane perpendicular to a central optical axis of a light propagating from said light sending element to said light receiving element;
   two motor members of which spindles are respectively connected to circle-shape plates, said frame member moving in said predetermined plane horizontally and vertically in response to a rotation of each of said circle-shape plates; and
   a guide plate member provided on said frame member including a projection part connected to one of said circle shape plates through a link member movable in one of horizontal and vertical directions in response to a rotation of said circle shape plate, and having a hollow portion along the other of direction in which a pin member fixed on said frame member and connected to the other of said circle-shape plate through an arm member is glidingly moved.

8. The filter conversion device according to claim 7 wherein said filter units comprises a red filter, a green filter, and an ND filter.

* * * * *

UNITED STATES PATENT AND TRADEMARK OFFICE
CERTIFICATE OF CORRECTION

PATENT NO. : 5,033,820

DATED : July 23, 1991

INVENTOR(S) : Y. HAMA

It is certified that error appears in the above-identified patent and that said Letters Patent is hereby corrected as shown below:

At column 6, line 40 of the printed patent, after 110, change ";" to ---,---.
At column 6, lines 65-66, of the printed patent, delete "having a function" after "machine".
At column 8, line 45 (claim 7, line 25) of the printed patent, change "glidingly" to ---slidably---.

Signed and Sealed this

Sixth Day of July, 1993

Attest:

MICHAEL K. KIRK

Attesting Officer

Acting Commissioner of Patents and Trademarks